United States Patent Office 3,809,614
Patented May 7, 1974

3,809,614
PROCESS FOR THE MANUFACTURE OF PROTEIN-CONTAINING SUBSTANCES FOR FODDER, FOODSTUFFS AND TECHNICAL APPLICATIONS
Kaj G. Forss, George Otto Gadd, and Ralf O. Lundell, Helsinki, and Harry W. Williamson, Kauniainen, Finland
No Drawing. Filed Aug. 5, 1971, Ser. No. 169,473
Claims priority, application Finland, Aug. 14, 1970, 2,242/70
Int. Cl. A23j 1/00; C12b 1/00
U.S. Cl. 195—81                                     9 Claims

ABSTRACT OF THE DISCLOSURE

Proteinaceous substances suitable for use as fodder and foodstuffs are manufactured by submerged aerobic culture of a species of mycelium-growing micro-organism of the genus Byssochlamys, Gliocladium, Paecilomyces, Spicaria or Trichoderma.

---

The present invention relates to a method for the manufacture of protein by the utilization of mycelium-growing microfungi belonging to the classes Ascomycetes or Fungi Imperfecti, by the application of growth solutions that contain inorganic and organic additives.

It has been known for some years that protein can be manufactured by the utilization of mycelium-growing micro-organisms, as stated in the German Pat. 744,677, and East German Pat. 752,815. In the U.S. Pat. 3,151,038 a list is given of a number of micro-organisms belonging to the class Fungi Imperfecti, and applicable for the manufacture of protein by batch cultivation in carbohydrate solutions. However, the protein content of the product so obtained is low, viz 20–40 percent protein (Kjeldahl $N \times 6.25$). It has been stated in the publication "Continuous Cultivation of Micro-Organisms, Proc. 2nd Symp. held in Prague June 18–23 1962," Publ. House Czechoslov. Acad. Sci., Prague, 1964, pp. 282–286, that micro-organisms of this type are unsuitable for the technical and fully continuous manufacture of protein, when carbohydrate-containing solutions are used as growth media. However, according to DDR-patent 30,809, continuous cultivation is successful when fatty acids are utilized as growth cultures. According to these publications, the cellular mass of micro-organisms of this type is easily separable from the growth culture by reason of its fibrous structure, whereas single-cell micro-organisms such as yeasts and bacteria must be separated from the growth solution by means of separators.

The present finding was made during studies of the practicability of utilizing carbohydrate-containing industrial waste for the manufacture of protein. Specifically, the aim was that of discovering a continuous method, suitable for industrial application, for the manufacture of protein, by submerged cultivation, under aerobic conditions, of different micro-organisms, and recovery of their protein-rich cellular mass. Surprisingly, we have noticed that the mycelium-growing micro-organisms, belonging to certain tribes of the classes Ascomycetes of Fungi Imperfecti, can be cultivated by means of a continuous process at a good yield of protein in a fermentor as aerobic-submerged cultures in a solution or suspension of carbohydrates and/or carbohydrate derivatives. The product can be separated in a conventional manner such as filtration. The surprising point, and an occurrence unexpected by those conversant with the subject, is that when these micro-organisms have been cultivated continuously for some time, usually for a week, a significant change becomes apparent in the properties of the micro-organisms. The long, rather sparingly branched mycelium is transformed into a short, thick and abundantly branched modification, retained on further cultivation of the mycelium. The viscosity of the mycelium-suspension is reduced markedly as a consequence of the change in the modification of the mycelium. This exercises a favorable influence upon the mixing and aeration in the reactor. At the same time, the growth rate of the micro-organism is considerably improved, and the micro-organism consumes practically all of the carbohydrates or carbohydrate derivatives without growth disturbances.

Another surprising phenomenon observed was that after this modification of the mycelium had taken place, that is to say a stable process stage had been brought about, the protein content of the mycelium amounted to 45–65 percent, or considerably in excess of the proportion attainable in technical scale batch cultivation. These alterations give rise to a greatly augmented yield of protein.

It has been observed as the result of thorough investigations that in the process of protein manufacture described above the following mycelium-growing micro-organisms are usable: those belonging to the tribe Byssochlamys of the class Ascomycetes, and those belonging to the tribes Gliocladium, Paecilomyces, Spicaria and Trichoderma of the class Fungi Imperfecti. The micro-organisms of these tribes are capable of attaining a stable state of growth and hence of exhibiting a high yield of protein.

The advantageous amino acid composition of protein products manufactured according to this invention appear from Table 1 that shows the amino acid compositions of two microfungi and, for comparison, the corresponding values of Torula fodder-yeast. The amino acid compositions of soya and wheat flour is also given, along with the FAO-recommendation issued in 1957 for the amino acid composition of protein. One can readily observe that the amino acid compositions of products manufactured by means of the method according to the invention are not essentially different from the amino acid compositions of Torula and soya flour.

TABLE 1
Amino acid compositions (g./16 g. N) of various proteinic products

|  | FAO recommendation | Paecilomyces varioti | Byssochlamys nivea | Torula yeast | Soya flour | Wheat flour |
|---|---|---|---|---|---|---|
| Lycine | 4.2 | 6.3 | 5.8 | 6.7 | 6.5 | 2.7 |
| Valine | 4.2 | 4.9 | 7.1 | 6.3 | 5.0 | 4.5 |
| Leucine | 4.8 | 7.2 | 7.5 | 7.0 | 7.7 | 6.5 |
| Isoleucine | 4.2 | 4.6 | 5.0 | 5.3 | 5.4 | 3.9 |
| Threonine | 2.8 | 4.8 | 4.7 | 5.5 | 4.0 | 3.0 |
| Methionine | 2.2 | 1.5 | 1.2 | 1.2 | 1.4 | 1.8 |
| Cysteine | 2.0 | 0.9 | 1.1 | 0.7 | 1.4 | 2.0 |
| Phenylalanine | 2.8 | 3.8 | 4.3 | 4.3 | 5.1 | 4.4 |
| Tryptophane | 1.4 | 1.5 | 2.7 | 1.2 | 1.5 | 1.1 |
| Histidine |  | 2.0 | 2.5 | 1.9 | 2.4 | 1.9 |
| Tyrosine |  | 3.6 | 2.7 | 3.3 | 2.7 | 3.9 |
| Arginine |  | 6.4 | 6.0 | 3.4 | 7.7 | 4.7 |
| Total | 28.6 | 47.5 | 50.6 | 46.8 | 50.8 | 40.4 |

Water solutions, or suspensions, of widely different carbohydrates or carbohydrate derivatives are utilizable as the culture medium in this method of micro-organism cultivation; the concentration range is 0.1–10 percent by weight. Moreover, industrial wastes can be used, such as the waste liquors of the woodworking industry. Accordingly, this finding is of intrinsic importance in respect of environmental protection and the utilization of some types of wastes. In addition, substances containing nitrogen and phosphorus must be present in the culture, as these are necessary for the growth of the micro-organisms, along with adequate amounts of various inorganic compounds. Further to this, different organic compounds and/or materials may be added to the culture for improvement in the yield of the protein process.

The nitrogen source of the process can consist of inorganic and/or organic compounds, such as ammonia, ammonium salts, nitrates, urea, peptides, polypeptides, and various mixtures of organic nitrogenous materials of vegetable or animal origin.

The source of phosphorus may be phosphoric acid and/or phosphates.

The concentrations of nitrogen and phosphorus in the culture medium fed into the fermentor are dependent upon the concentration of the carbohydrates or carbohydrate derivatives. The amount of nitrogen and phosphorus needed for the process is usually 6–12 and 1–3 percent respectively, based on the dry weight of the product formed.

Inorganic trace substances required in the process include e.g. potassium, magnesium, iron, zinc, manganese, copper and molybdenum, which are added to the culture as required, for example in the form of inorganic salts. Frequently, trace substances of this type are already in existence within the culture.

For improvement of the growth various so-called biostimulators, such as vitamins, may be added to the culture. These organic substances are frequently introduced into the culture in the form of yeast extract, corn steep liquor, or other products of similar type.

As a rule, trace substances and biostimulators are employed in very small amounts.

The pH of the growth solution is adjusted to 3.0–6.0, depending upon the micro-organism and solution used.

It has further become apparent that it is favorable to sterilize the growth medium before the cultivation process is started. In this case, the sterilization may be effected in a conventional manner. However, sterilization is not required in all instances. Media may be sterile by reason of a previous process.

The process is run in the following way:

The process is started as a conventional batch culture. When the concentration of the mycelium has attained the desired level in the growth solution, continuous cultivation is begun, with new growth medium being fed into the fermentor, and an equivalent amount of spent medium along with the products, extracted from it. In the initial stage of the process, difficulties are encountered in the attempts to maintain an even concentration of the mycelium. However, after 100 to 300 hours, stabilization is attained, and the concentration of the mycelium can be maintained at a desired level by adjustment of the growth solution flow rate. At the batch cultivation stage, and at the beginning of continuous operation, the mycelium is usually long-fibred with few branches. During the period of stabilization, the mycelium is transformed into a short, broad and multi-branched form. This change gives rise to a reduction in the viscosity of the culture. This makes it possible to increase the concentration of the mycelium in the solution, and thus increase the output.

The substances required in the process may be included in the culture solution pumped into the fermentor and/or may be introduced separately into the fermentor directly. From 20 to 100 percent of air, based upon the culture volume, is led into the fermentor during each minute. As a general rule, the culture is stirred to improve the aeration, and material and heat exchange. The pH (3.0–6.0) and temperature (20°C.–50° C.) are kept constant. The average residence time of the micro-organisms varies; this depends upon the growth medium and the micro-organism utilized, and is normally 2–7 hours. The used solution removed from the fermentor is transferred to the after-treatment equipment, where the product is separated from the spent medium, for example by filtration. It is then washed and dried.

It appears from the literature, for example Wogan, G. N. "Mycotoxins in Foodstuffs," M.I.T. Press, Cambridge, 1964 that certain species of the class Fungi Imperfecti have toxic qualities. Acute toxicity tests using the products manufactured according to the invention in diets of rats however indicated that the materials are non-toxic.

Pigs, calves, minks and chickens were fed with products manufactured by the method according to the invention. The results of feeding tests with pigs are given here below as example.

Four test groups, each comprising 24 pigs, were given barley flour and skim milk powder and/or microfungi granules as shown below:

I-group, skim milk powder, 1 part+microfungigranules, 0 part

II-group, skim milk powder, ⅔ part+microfungigranules, ⅓ part

III-group, skim milk powder, ⅓ part+microfungigranues, ⅔ part

IV-group, skim milk powder, 0 part+microfungigranules, 1 part

Table 2 shows the average weight (kg.) development of the test animals.

TABLE 2

| Feeding time | I | II | III | IV |
|---|---|---|---|---|
| 0 month, kg | 20.8 | 20.8 | 20.8 | 20.8 |
| 1 month, kg | 41.8 | 41.5 | 41.8 | 41.1 |
| 2 months, kg | 63.6 | 63.4 | 63.0 | 62.7 |

Accordingly, no essential weight differences between the test animals and the control animals can be observed.

EXAMPLE 1

The following example describes a known procedure of the batch cultivation of microfungi that grow mycelium.

The cultivation was carried out in a glass-walled sterilizable laboratory fermentor, 14 l. in capacity, and provided with a propeller mixer and an aerator. The fermentor apparatus included equipment for the automatic adjustment of pH and temperature, and foam control.

Ten liters of spruce calcium bisulphite spent liquor was introduced into the reactor. The solids content of the liquor was 9.0%, the pH was 2.5, the content of reducing substances was 35 g./l. calculated as glucose, and the directly titratable $SO_2$ amounted to approximately 0.1 g./l. The solution was sterilized in the reactor; 80 ml. of ammonium hydroxide (25%) and 6.0 ml. of phosphoric acid (85%) were added by a sterile procedure. The pH of the solution was adjusted to the cultivation value by the addition of ammonia and hydrochloric acid. An amount of 600 ml. of a mycelium suspension cultivated in the same spent liquor was then introduced into the fermentor. After the inoculation, the mycelium concentration in the fermentor was 0.2 g./l. The micro-organism cultivated was *Paecilomyces varioti*, or *Spicaria divaricata*, of Fungi Imperfecti.

The following conditions prevailed throughout the cultivation: temperature 37–38° C., pH 4.4–4.5, air flow about 4 l./m., and mixing 1200 r.p.m.

Six hours after the inoculation it was noticeable that growth had commenced. The growth rate of the micro-organism is indicated in Table 3.

TABLE 3

| Time, hours: | Concentration of the micro-organism in the spent liquor, g./l. |
|---|---|
| 0 | 0.2 |
| 6 | 0.4 |
| 10 | 1.4 |
| 13 | 3.1 |
| 16 | 4.5 |
| 19 | 7.5 |
| 22 | 11.0 |
| 25 | 13.7 |
| 28 | 14.2 |
| 31 | 13.0 |

The productivity of the mycelium, that is to say the rate of change of mycelium concentration, exhibited a maximum of about 1 g.·l.$^{-1}$.h.$^{-1}$ when the concentration was about 3 g./l. With a rise in the concentration of the mycelium, the productivity was retarded; when the concentration of 14.2 g./l. had been reached after 28 hours, the mycelium concentration began to fall. When the concentration was at its highest level, the content of reducing substances in the culture was 6 g./l. calculated as glucose. However, thin-layer chromatographic analysis indicated that the carbohydrates had been fully consumed; consequently, the remaining reducing property is attributable to other components of the spent sulphite liquor.

Microscopic investigation of the mycelium demonstrated that it was of relatively long, thin and sparsely branched configuration.

The protein content (percentage of protein=6.25×N%)

was determined when the concentration of micro-organisms was 7.5 g./l. and 14.2 g./l., with the corresponding protein values being 45% and 34.6%. In conformity with the data in the literature on technical-scale batch cultivation, the protein content of the cellular masses was low, particularly in those cases in which considerable quantities of mass had been formed.

The examples described below illustrate the performance of continuous cultivation by application of the present procedure. It should be born in mind that the examples serve only to describe seven typical cultivations, and that the maximum levels for the concentrations of micro-organisms, and hence also the productivity, are dependent upon the nutrient concentration in the growth culture.

EXAMPLE 2

Continuous cultivation

The equipment employed in this cultivation was the same as that in the previous example of batch cultivation, but modified in such a way that a desired amount of spent sulphite liquor could be fed continuously into the reactor by means of a dosage pump. The reactor was also provided with an appropriate device for removal of the product. The spent sulphite liquor and the micro-organism were the same as in the batch cultivation described in Example 1. Continuous cultivation was begun when the initial stage of batch cultivation had proceeded for a period of about 20 hours, measured from the moment of inoculation. When continuous operation started, the concentration of the mycelium was 8 g./l. Sterilized spent sulphite liquor, to which had previously been added the nutrients required, was fed into the reactor. 8 ml. of $NH_4OH$ (25%) and 0.6 ml. of $H_3PO_4$ (85%) were used per liter of spent sulphite liquor. The amount of the product solution continuously removed was such that the volume of liquid in the reactor, and accordingly also the residence time, were maintained at constant levels.

During the cultivation, the mixing, temperature, pH and air flow corresponded to those in the batch cultivation.

The concentration of micro-organisms in the spent sulphite liquor could be kept at the desired level by alteration in the mean residence time, i.e. by changing either the volumetric flow rate or the volume of liquid in the reactor. The concentration varied in the initial stages of the cultivation, but after about 100 hours equilibrium in growth was attained. The concentration of the micro-organism in the spent liquor could then easily be maintained within 13–14 g./l. The reducing capacity of the spent liquor was then about 6 g./l. (cf. batch cultivation), dependent upon the concentration of the organism.

There was a marked increase in the rate of mycelium growth as continuous cultivation proceeded. At about 48 hours after commencement of the continuous stage, the productivity was 1.5 g./l.h. After 200 and 400 hours of continuous cultivation, the productivity figures were 2.6–2.7 and 2.8 g./l.h., respectively.

The growth of the mycelium during the course of continuous operation was studied by microscopic investigation. During the first 100 hours, the mycelium changed into a thick, short and highly branched modification, which retained throughout the cultivation.

In addition to the augmented productivity, it was noted that the protein content rose to a level higher than that in batch cultivation. At the beginning of the continuous stage, the protein content amounted to about 40 percent. After the growth had attained equilibrium, the protein content gradually rose to 50–52 percent. The best value in this example was 52.2%. The product had ash and fat content of 5–6% and 3–4%, respectively.

In the example, the productivity is expressed by the product $$X \cdot \frac{F}{V}$$

X denotes the concentration of micro-organism in the culture solution (g./l.), V is the volume in the fermentor (l.), and F the percolation rate of the culture solution (l./h.).

One of the major advantages of this procedure becomes most clearly evident when a comparison is drawn between the protein productivity in technical-scale batch cultivation, and that in the continuous, newly invented process. For the mycelium concentrations 7.5 g./l. and 14.2 g./l., the productivity of protein in the batch cultivations described in the examples are $$\frac{45.0}{100} \times 7.5 \text{ g.·l.}^{-1} \times 0.14 \text{ h.}^{-1} = 0.47 \text{ g.·l.}^{-1} \cdot \text{h.}^{-1}$$

and $$\frac{34.6}{100} \times 14.2 \text{ g.·l.}^{-1} \times 0.015 \text{ h.}^{-1} = 0.074 \text{ g.·l.}^{-1} \cdot \text{h.}^{-1}$$

According to Example 2, protein productivity at the beginning of continuous cultivation was $$\frac{40.0}{100} \times 1.5 \text{ g.·l.}^{-1} \cdot \text{h.}^{-1} = 0.60 \text{ g.·l.}^{-1} \cdot \text{h.}^{-1}$$

In the condition of stable growth, the protein productivity rose considerably; in the later stages of the continuous run, it was $$\frac{52.0}{100} \times 2.8 \text{ g.·l.}^{-1} \cdot \text{h.}^{-1} = 1.45 \text{ g.·l.}^{-1} \cdot \text{h.}^{-1}$$

EXAMPLE 3

A fermentor 150 l. in capacity, equipped with two radial turbines and normal adjustment devices, was employed in the cultivation. The spent liquor was fed into the fermentor, and removed from it by means of dosage pumps in such a manner that the cultivation volume in the fermentor was maintained at a constant level. The micro-organism, spent liquor and nutrients were the same as those described in Example No. 1. The condition of cultivation was as follows: temperature 36–40° C., pH 4.0–5.0, air flow about 50 l./min. and stirring 560 r.p.m. The inoculum consisted of 10 liters of mycelium suspension taken from a 14-liter fermentor, in which the mycelium had been continuously cultivated for about a week. At the moment of inoculation, the productivity was about 2.0 g./l.$^{-1}$ h.$^{-1}$, and the concentration of mycelium in the spent liquor about 12 g./l. The cultivation was continued for two weeks; during this period, the productivity rose to 2.8 g./l. h.; the concentration of the mycelium in the culture was 13–14 g./l. It was observed that the change in mycelium modification had begun at the inoculation stage, although the mycelium did not become thick and highly branched until transferred to the large fermentor.

At the moment of inoculation, the protein content of the product was about 45%; it rose later during the course of cultivation to 52–56 percent, with a maximum value of 56.8% being attained. In accordance with Example 2, the protein productivity at the moment of inoculation amounted to $$\frac{45.0}{100} \times 2.0 \text{ g.·l.}^{-1}\text{·h.}^{-1} = 0.90 \text{ g.·l.}^{-1}\text{·h.}^{-1}$$

and after two weeks of cultivation, to $$\frac{56.0}{100} \times 2.8 \text{ g.·l.}^{-1}\text{·h.}^{-1} = 1.57 \text{ g.·l.}^{-1}\text{·h.}^{-1}$$

EXAMPLE 4

The same micro-organism, equipment and cultivation technique were employed as in Example 2. A sterile glucose soltuion, 3% w./w., was fed into the fermentor. The following nutrients had been added per liter of glucose solution:

| | | |
|---|---|---|
| $(NH_4)_2SO_4$ | g | 3.5 |
| $NH_4OH$ (25%) | ml | 4.0 |
| $H_3PO_4$ (85%) | ml | 0.6 |
| $KCl$ | g | 0.15 |
| $MgSO_4 \cdot 7H_2O$ | g | 0.15 |
| $Fe_2(SO_4)_3$ | mg | $1.4 \text{–} 10^{-3}$ |
| $ZnSO_4 \cdot 7H_2O$ | mg | $0.9 \cdot 10^{-3}$ |
| $CuSO_4 \cdot 5H_2O$ | mg | $0.2 \cdot 10^{-3}$ |
| $MnSO_4 \cdot 4H_2O$ | mg | $0.1 \cdot 10^{-3}$ |
| $(NH_4)_2MoO_4$ | mg | $0.05 \cdot 10^{-3}$ |

The pH of the culture was adjusted during cultivation by the addition of ammonia (25%) and hydrochloric acid (5 M).

In conformance with previous experiments, it was observed that the rate of mycelium growth increased as continuous cultivation proceeded. The mycelium changed into a highly branched, thick and short modification within 150–200 hours; the concentration of the mycelium could then be maintained within 13–14 g./l., with a resulting productivity of 2.7–2.8 g./l.h. The glucose concentration was very low in the culture solution removed. The protein content of the product rose to 54–56%, its ash content was 5–6% and fat content 2–4%.

EXAMPLE 5

The organism cultivated in this example was *Paecilomyces puntonii*, of Fungi Imperfecti. The cultivation conditions were the same as in Example 2, except that the temperature was 32–34° C., and the pH 4.9–5.3. Stable growth was attained about 150 hours after the start of the cultivation; the productivity then remained at about 2.8 g./l.h., and the mycelium concentration in the solution was about 13 g./l. The protein content of the product was 50–52%.

EXAMPLE 6

The organism cultivated in this example was *Gliocladium virens*, of Fungi Imperfecti. The cultivation was carried out in the same way as in Example 2, except that the temperature was 24–27° C., and the pH 5.6–6.0. Stable growth was attained about 150 hours after the start of the cultivation. At the stable stage, the productivity was about 1.6 g./l.h., and the mycelium concentration about 11 g./l. The protein content of the product was about 50–52 percent.

EXAMPLE 7

The organism cultivated in this example was *Trichoderma viride*, of Fungi Imperfecti. Cultivation was carried out in the same way as in Example 2, except that the cultivation temperature was 28–30° C., and the pH 3.9–4.1. Stable growth was attained after about 300 hours; the productivity was about 1.8 g./l.h., and the mycelium concentration in the culture solution about 12 g./l. The protein content of the product was 54–57 percent.

EXAMPLE 8

The organism cultivated in this example was *Byssochlamys nivea*, of Ascomycetes). The cultivation was carried out in the same way as in Example 2, except that the cultivation temperature was 33–35° C., and the pH 4.6–4.9. Stable growth was attained after about 200 hours, after which the productivity was about 2.6 g./l.h., and the mycelium concentration in growth medium culture about 13 g./l. The protein content of the product amounted to 51–53 percent.

What we claim is:

1. A process for the continuous manufacture of protein-containing substance, which comprises the continuous cultivation under aerobic conditions of a species of mycelium growing micro-organisms selected from the genus Byssochlamys, Gliocladium, Paecilomyces, Spicaria or Trichoderma at a temperature of about 20° to 55° C. and a pH of about 3 to 6 in an aqueous culture medium comprising a carbohydrate or carbohydrate-derivative and a source of nitrogen for a sufficient time to transform mycelia of the micro-organisms into relatively short, abundantly branched modification as compared with long, sparingly branched mycelia of untransformed micro-organisms, whereby to accumulate mycelium in said medium, and removing cultivated mycelium from the medium when the protein content of said mycelium exceeds 45% by weight.

2. A process according to claim 1, wherein the carbohydrate or carbohydrate-derivative comprises spent sulphite liquor from an industrial woodworking operation.

3. A process according to claim 1, wherein the carbohydrate comprises glucose.

4. A process according to claim 1, wherein the culture medium includes a source of phosphorus.

5. A process according to claim 4, wherein the phosphorus source comprises from 1 to 3% by weight of a phosphorus compound selected from the group of phosphoric acid and phosphates, based on the dry weight of the product formed.

6. A process according to claim 1, wherein the nitrogen source is selected from the group consisting of ammonia, ammonium salts, nitrates, peptides, polypeptides or nitrogenous organic material of animal or vegetable origin.

7. A process according to claim 1, wherein the culture medium includes one or more trace elements selected from the group consisting of potassium, magnesium, iron, zinc, manganese, copper and molybdenum.

8. A process according to claim 1, wherein the culture medium includes a biostimulator selected from the group consisting of yeast extract and corn steep liquor.

9. A process according to claim 1, wherein the species of micro-organism is selected from the group consisting of *Paecilomyces varioti*, *Paecilomyces puntonii*, *Gliocladium virens*, *Trichloderma viride*, *Byssochlamys nivea* and *Spicaria divaricata*.

References Cited

UNITED STATES PATENTS

| | | | |
|---|---|---|---|
| 3,151,038 | 9/1969 | Gray | 195—32 |
| 3,384,491 | 3/1968 | Guenther et al. | 99—9 |
| 2,331,454 | 5/1943 | Heyns | 195—37 |
| 3,647,633 | 3/1972 | Dawson | 195—139 |

LIONEL M. SHAPIRO, Primary Examiner

T. G. WISEMAN, Assistant Examiner

U.S. Cl. X.R.

195—115; 426—60